(12) United States Patent
Wood

(10) Patent No.: US 6,348,907 B1
(45) Date of Patent: Feb. 19, 2002

(54) DISPLAY APPARATUS WITH DIGITAL MICROMIRROR DEVICE

(76) Inventor: Lawson A. Wood, 905 N. Frederick St., Arlington, VA (US) 22205

( * ) Notice: Subject to any disclaimer, the term of this patent is extended or adjusted under 35 U.S.C. 154(b) by 0 days.

(21) Appl. No.: 08/381,156

(22) Filed: Jan. 31, 1995

Related U.S. Application Data

(63) Continuation-in-part of application No. 08/034,694, filed on Mar. 19, 1993, now Pat. No. 5,416,496, which is a continuation-in-part of application No. 07/862,313, filed on Apr. 2, 1992, now abandoned, which is a continuation-in-part of application No. 07/521,399, filed on May 10, 1990, now Pat. No. 5,128,782, which is a continuation-in-part of application No. 07/396,916, filed on Aug. 22, 1989, now abandoned.

(51) Int. Cl.[7] .................................. G09G 3/34
(52) U.S. Cl. .............................. 345/84; 345/86
(58) Field of Search ...................... 345/84, 85, 86, 345/108, 109, 111, 214, 207, 764, 755, 770, 771; 359/223, 224, 225, 261, 263, 264, 846, 847, 848, 849; 348/764, 771

(56) References Cited

U.S. PATENT DOCUMENTS

| | | | |
|---|---|---|---|
| 3,896,338 A | * | 7/1975 | Nathanson et al. ......... 348/771 |
| 5,096,279 A | | 3/1992 | Hornbeck et al. |
| 5,122,791 A | | 6/1992 | Gibbons et al. |
| 5,210,653 A | * | 5/1993 | Schell ........................ 359/846 |
| 5,280,277 A | | 1/1994 | Hornbeck |
| 5,386,250 A | | 1/1995 | Guerinot |
| 5,386,253 A | * | 1/1995 | Fielding ..................... 348/764 |
| 5,452,024 A | * | 9/1995 | Sampsell .................... 345/84 |

OTHER PUBLICATIONS

Jack M. Younse, "Mirrors On A Chip," *IEEE Spectrum* (Nov. 1993), pp. 27–31.

* cited by examiner

*Primary Examiner*—Xiao Wu

(57) ABSTRACT

A display apparatus includes a digital micromirror device and red, green and blue lamps which illuminate it. The light from the lamps impinges on the DMD from at least two different directions. The lamps may be flash tubes which are fired at different binary levels in accordance with the rank of the bits that are being displayed on the DMD. The lamps may be fluorescent lamps which are driven steadily at predetermined levels while the rows of micromirrors are turned on in sequence and subsequently turned off in sequence. Resetting to dislodge micromirrors that have become stuck can be accomplished by emitting current pulses through the micromirrors while exposing them to a magnetic field, or by coating the actuation electrodes of the DMD with piezoelectric material which moves mechanically when pulses are applied to the micromirrors.

47 Claims, 9 Drawing Sheets

DISPLAY APPARATUS WITH DIGITAL MICROMIRROR DEVICE

CROSS-REFERENCE TO RELATED APPLICATIONS

This application is a continuation-in-part of application Ser. No. 08/034,694, filed Mar. 19, 1993, now Pat. No. 5,416,496 which was a continuation-in-part of application Ser. No. 07/862,313, filed Apr. 2, 1992, which was a continuation-in-part of application Ser. No. 07/521,399, filed May 10, 1990, which was a continuation-in-part of application Ser. No. 07/396,916, filed Aug. 22, 1989. The disclosures of these prior applications are incorporated herein by reference. Application Ser. No. 07/521,399 matured into U.S. Pat. No. 5,128,782, issued Jul. 7, 1992. Application Ser. No. 08/034,694 has been allowed. Application Ser. No. 07/396,916 and application Ser. No. 07/862,313 have been abandoned.

BACKGROUND OF THE INVENTION

The present invention is directed to a display apparatus which employs a digital micromirror device.

A digital micromirror device is a spatial light modulator which employs an array of thin mirrors, or micromirrors, whose positions can be electrically controlled in order to display an image. This technology has been developed extensively by Larry J. Hornbeck and his colleagues at Texas Instruments, Inc. of Dallas, Tex., and is described by them in a sequence of patents going back more than a decade. These developmental efforts have culminated in a digital micromirror device which includes an array of memory cells and a corresponding array of pivotable micromirrors whose positions are electrostatically adjusted by the contents of the memory cells. As s perhaps best described in U.S. Pat. No. 5,096,279 to Hornbeck et al, the array of pivotable micromirrors that cooperates with the memory cells can be made using integrated circuit fabrication techniques.

As is described in the above-identified patent, in U.S. Pat. No. 5,280,277 to Hornbeck, and in an article entitled "Mirrors on a Chip" that was published in the November, 1993 issue of *IEEE Spectrum* at pages 27–31 by Jack M. Younse, a negative biasing voltage is selectively applied to the micromirrors and to landing electrodes fabricated beneath them in order to obtain bistable operation of the micromirrors and simultaneous updating of the entire array of micromirrors. Sometimes the micromirrors get stuck It is known that this problem can be cured by subjecting the micromirrors to resonant reset pulses which electrostatically dislodge any stuck micromirrors.

It is also known to make a color display using a single digital micromirror device by sequentially exposing it to red, green, and blue light impinging from a single direction. A white lamp and a color wheel can be employed for this purpose. If three digital micromirror devices can be devoted to a display, each of them can be illuminated by light of a different primary color and the resulting red, green and blue images can be superimposed on a screen.

Advances have also been made in other types of display apparatuses. For example U.S. Pat. No. 5,122,791 to David J. Gibbons et al discloses a ferroelectric LCD panel which is selectively backlit by red, green, and blue fluorescent tubes. The intensity or duration of the backlighting is controlled on the basis of the rank of the bits that are being displayed on the panel.

SUMMARY OF THE INVENTION

A primary object of the invention is to provide an improved display apparatus which employs only one digital micromirror device.

Another object of the invention is to provide a display apparatus in which a digital micromirror device is exposed to light at different binary levels.

Another object of the invention is to provide novel techniques for resetting a digital micromirror device so as to dislodge any stuck micromirrors.

Yet another object of the invention is to provide a display apparatus which employs a digital micromirror device wherein the micromirrors are not updated all at once, but are instead updated on a row-by-row basis while being exposed steadily to light.

In accordance with one aspect of the invention, a display apparatus includes a digital micromirror device having an array of movable micromirrors, along with exposing means for exposing them to light of a first primary color which impinges on the array from a first direction and to light of a second primary color which impinges on the array from a second direction. The first and second directions may lie in a common plane, which permits a micromirror that is ON with respect to the first primary color and OFF with respect to the second primary color when it (the micromirror) is in one of two positions to be OFF with respect to the first primary color and ON with respect to the second primary color when it (the micromirror) is in the other of the two positions. In this situation the light of the first and second primary colors impinges on the array at different times, possibly in sequences of flashes having different binary levels.

In accordance with a further aspect of the invention, a display apparatus includes a digital micromirror device having an array of movable micromirrors, along with resetting means for dislodging any micromirrors that become stuck, the resetting means including means for exposing the array of micromirrors to a magnetic field. Current through the array of micromirrors interacts with the magnetic field to jostle the micromirrors. A related aspect of the invention provides that a resetting means for dislodging any micromirrors that become stuck may include piezoelectric material beneath the micromirrors.

In accordance with a further aspect of the invention, a method for displaying a sequence of frames of video information on a digital micromirror device is provided. The digital micromirror device has an array of micromirrors that are disposed in rows and that are movable between a first position and a second position. The video information for a frame includes a plurality of first multi-bit video words (such as multi-bit video words for the red component of an image), and each micromirror corresponds to one of the first multi-bit video words. Furthermore, each of the first multi-bit video words includes at least a most significant bit and a least significant bit. The displaying method includes the step of moving micromirrors which correspond to first video words whose least significant bit has a predetermined value from their first positions to their second positions, the micromirrors of a first one of the rows being moved before the micromirrors of a last one of the rows. This is followed by the step of returning the micromirrors that were moved during the first step to their first positions, the micromirrors of the first row being returned before the micromirrors of the last row. The display method also includes the step of steadily exposing the micromirrors to light at a first level while the first step is conducted and while the second step is conducted. If the micromirrors are activated on a row-by-row basis when the first and second steps are performed and if the first and second steps are conducted at the same rate, each micromirror that is moved from its first position to its second position and then back to its first position receives the same amount of light while in the second position, regardless of the micromirror's row. Consequently the micromirrors need not all be moved at once despite the steady illumination. It is noted that the micromirrors need not all be moved at once if they are illuminated in discrete flashes, either, instead of by steady exposure in accordance with this aspect of the invention.

DESCRIPTION OF THE PREFERRED EMBODIMENTS

Various embodiments of a display apparatus in accordance with the present invention will now be described in detail with reference to the accompanying drawings.

The First Embodiment

Figure 1:
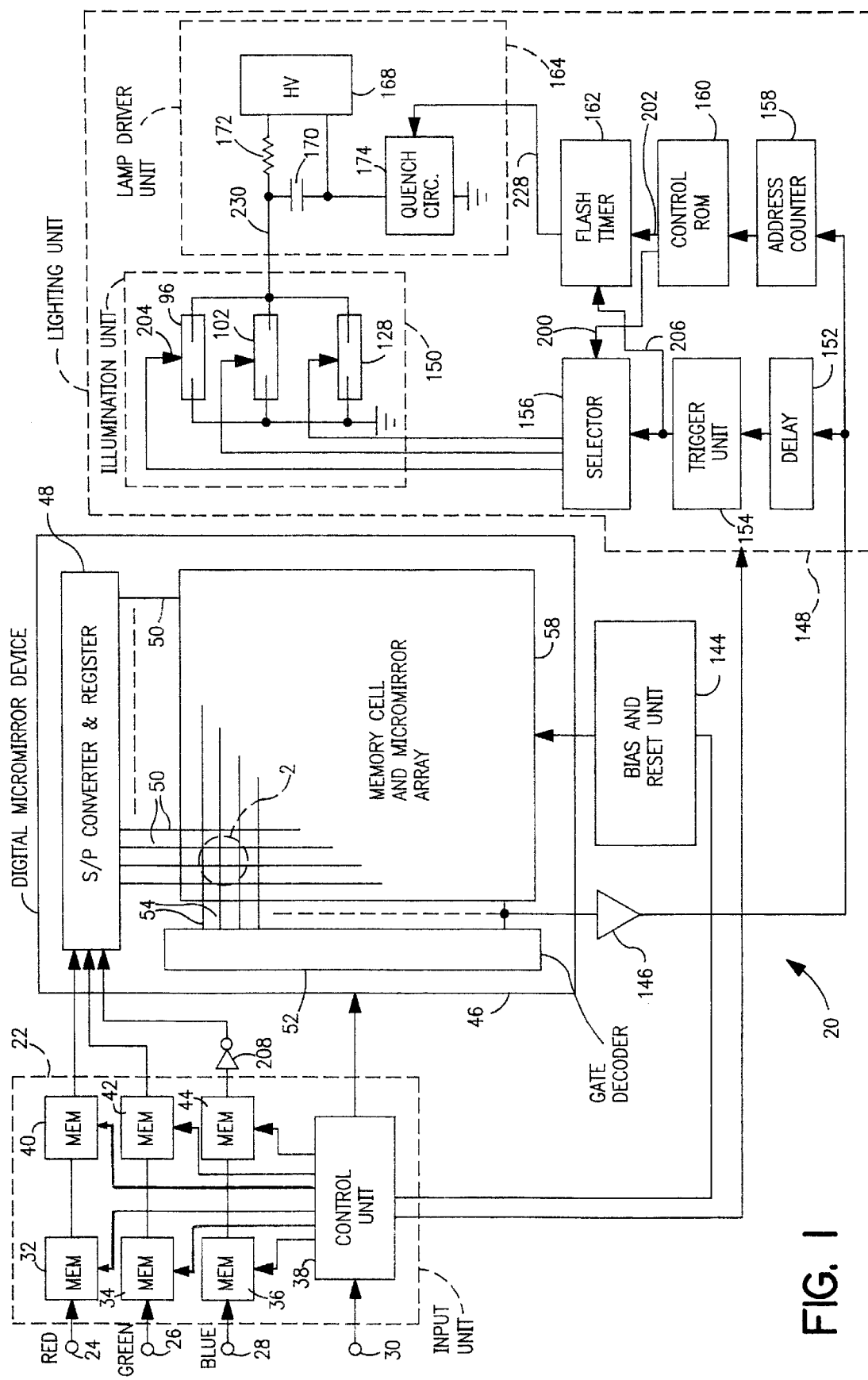
FIG. 1 is a block diagram of a display apparatus in accordance with a first embodiment of the present invention.

With initial reference to FIG. 1, a display apparatus 20 in accordance with the first embodiment includes an input unit 22 having an input terminal 24 for receiving a digitalized signal for the red component of an image, an input terminal 26 for receiving a digitalized signal for the green component, an input terminal 28 for receiving a digitalized signal for the blue component, and an input terminal 30 for receiving synchronization signals. The digitalized signals for the red, green, and blue components consist of multi-bit video data words (hereafter usually referred to as "video words"), each specifying one of a plurality of binary levels for the red, green, or blue intensity of a corresponding pixel that is to be displayed. The video words for the red, green, and blue components are stored in respective frame memories 32, 34, and 36 under the control of a control unit 38. When a full frame is stored, control unit 38 transfers the contents of memories 32–36 to further frame memories 40, 42, and 44 and then begins storing the next frame in memories 32–36. Control unit 38 also reads out the contents of memories 40–44 to a digital micromirror device 46 (hereafter occasionally referred to as "DMD 46").

Figure 2:
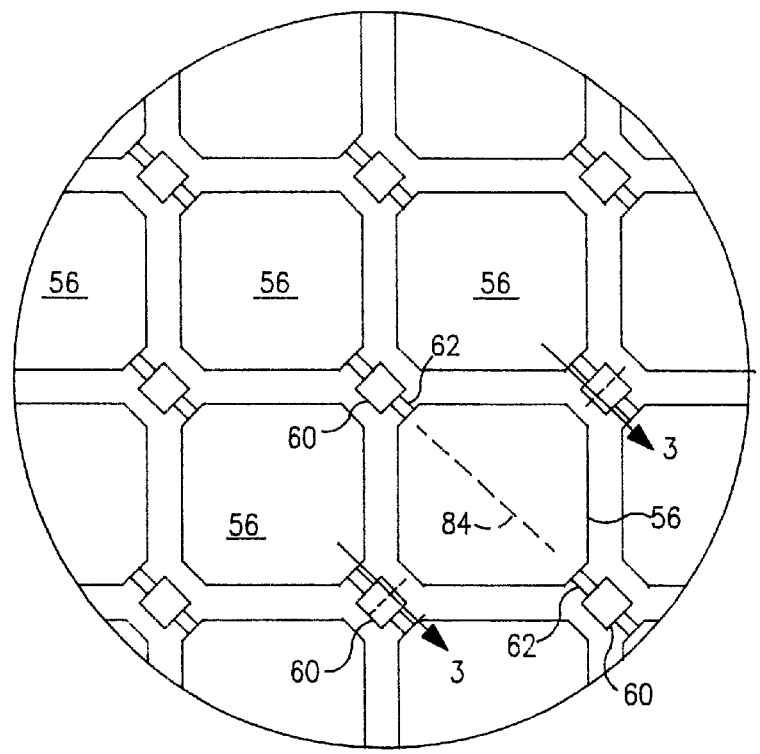
FIG. 2 is a top plane view of a detail marked 2 in FIG. 1, and shows a portion of an array of micromirrors.
Figure 3:
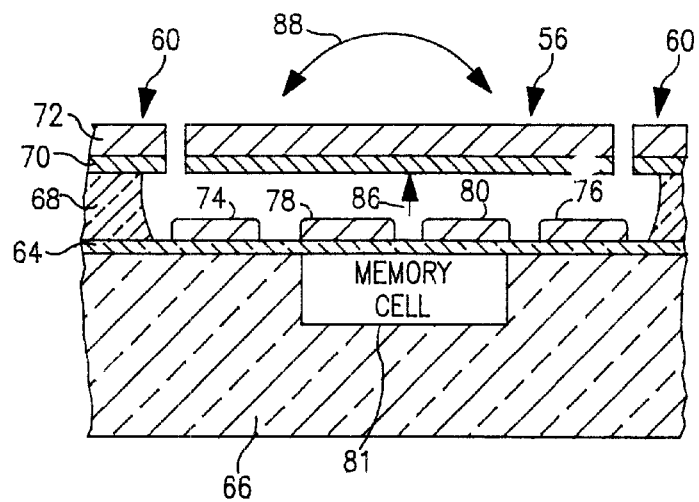
FIG. 3 is a cross-sectional view taken along line 3—3 of FIG. 2.

DMD 46 is basically an integrated circuit memory having an array of static random access memory cells, addressing means for storing data in the cells, and tiny movable mirrors or micromirrors which cooperate with the memory cells. It will be described in more detail with reference to FIGS. 1–3.

The addressing means of DMD 46 includes a serial/parallel converter and register 48 which receives a series of bits as input data and adjusts the voltages on column electrodes 50 in accordance with the input data. A gate decoder 52 strobes row electrodes 54 in sequence. Each time a row electrode is strobed the data on the column electrodes 50 is stored in a row of static memory cells corresponding to the row electrode. A micromirror 56 is disposed above each memory cell. The memory cells and micromirrors together form an array which is designated by reference number 58 in FIG. 1.

Each micromirror 56 is supported between a pair of posts 60 by torsion hinges 62. The posts 60 extend upward from a silicon dioxide layer 64 that has been deposited on a substrate 66. Each post 60 includes portions of an insulating spacer layer 68, a first metal layer 70, and a second metal layer 72. A micromirror 56 includes portions of both metal layers, while the torsion hinges 62 are fabricated from first metal layer 70 alone.

Landing electrodes 74 and 76 and actuation electrodes 78 and 80 are disposed below the micromirror 56. A negative bias voltage is selectively applied to the landing electrodes 74 and 76 and to the micromirrors 56.

The activation electrodes 78 and 80 are connected to complementary outputs of a static memory cell 81. When a value is stored in memory cell 81, one of the actuation electrodes 78 and 80 is at ground potential and the other has a positive potential. This creates a torque urging the micromirror 56 to rotate clockwise or counter-clockwise about an axis 84. Axis 84 is perpendicular to the drawing in FIG. 3 at a position marked by an arrow 86, which can be viewed as a pivot point. However the magnitude of the bias voltage applied to the micromirrors 56 and to the landing electrodes 74 and 76 is selected so that the micromirrors 56 are bistable in their operation. The bias voltage prevents the micromirrors 56 from moving in response to the torque exerted by the potentials on the actuation electrodes 78 and 80 until the bias voltage is relieved, whereupon the micromirrors 56 rotate to their new positions (if they are different from the old positions) or remain in their old positions (if they are the same as the new positions), and then the bias voltage is reapplied in order to electromechanically latch the micromirrors. This movement is indicated schematically in FIG. 3 by arrow 88. The micromirrors occasionally stick in one position or the other, possibly due to cold welding to one of the landing electrodes 74 or 76. Stuck micromirrors 56 can be dislodged by applying resonant reset pulses to the landing electrodes and micromirrors at a frequency corresponding to the resonance frequency of the micromirrors.

Further details of the fabrication and operation of DMD 46 can be obtained from U.S. Pat. Nos. 5,096,279 and 5,280,277 and from an article by Jack M. Younse entitled "Mirrors on a Chip," published at pages 27–31 of the November, 1993 issue of *IEEE Spectrum*.

Figure 4:
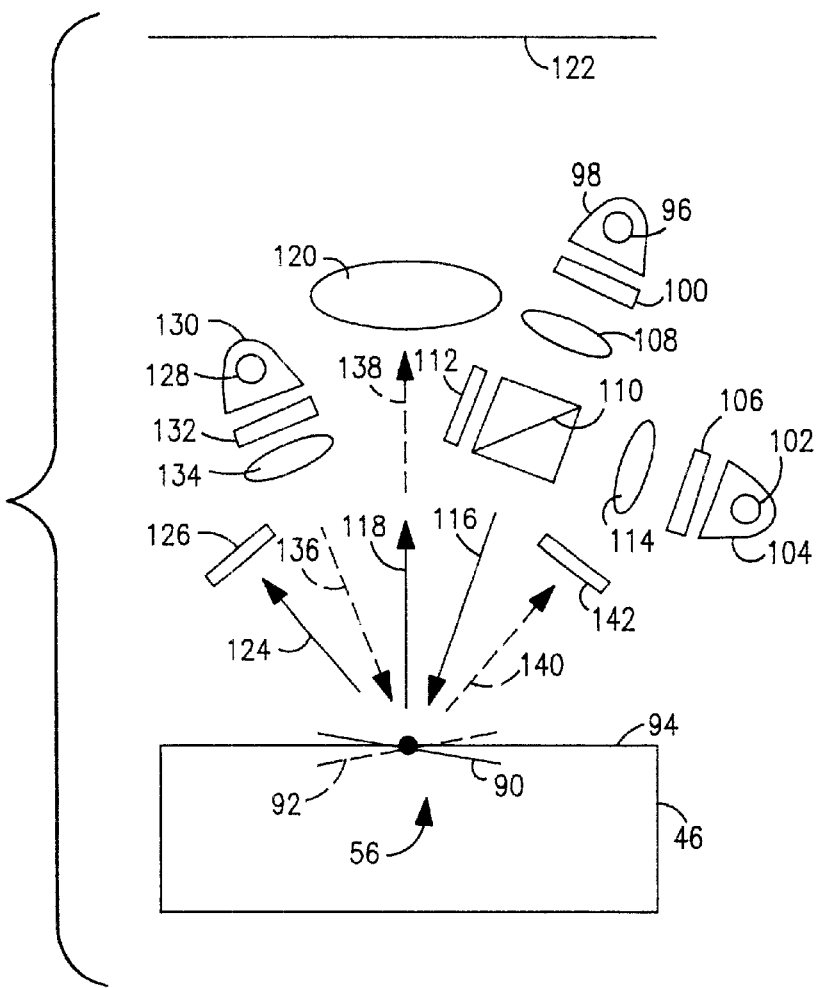
FIG. 4 schematically illustrates a lighting arrangement which is used in the first embodiment to expose the digital micromirror device to light impinging from two different directions.

In FIG. 4, a solid line 90 is used to schematically illustrate a micromirror 56 in a first position and a dotted line 92 is used to illustrate it in its second position. In its first position the micromirror 56 is rotated 10 clockwise from a horizontal plane 94 and in its second position the micromirror 56 is rotated about 10° counterclockwise. The plane 94 is parallel to the top surface of substrate 66 (see FIG. 3).

With continuing reference to FIG. 4, a lamp such as a flash tube 96 is disposed in a reflector 98 behind a red filter 100 and a lamp such as a flash tube 102 is disposed in a reflector 104 behind a green filter 106. Flash tube 96 will occasionally be referred to as the "red flash tube" hereafter, and similarly, flash tube 102 will hereafter occasionally be referred to as the "green flash tube". Light from flash tube 96 is directed through a collimating system 108 to a half-silvered mirror 110. Mirror 110 reflects half the light from flash tube 96 to an absorber 112 (black velvet, for example) and transmits the other half. A collimating system 114 is disposed between flash tube 102 and half-silvered mirror 110, which transmits half of the light from flash tube 102 to absorber 112 and reflects the other half. The transmitted light from flash tube 96 and the reflected light from flash tube 102 impinges on DMD 46 from a first direction that is indicated by arrow 116. Arrow 116 is disposed at an angle of 70° with respect to plane 94. When micromirror 56 is in its first position as indicated by solid line 90, light impinging from the first direction is reflected at an angle of 90° with respect to plane 94, as indicated by arrow 118. This light passes through a projection system 120 to a screen 122. However if light impinging from the first direction strikes a micromirror 56 which is in its second position, as indicated by dotted line 92, the impinging light is reflected in a direction marked by arrow 124 to an absorber 126. Arrow 126 is disposed at an angle of 50° with respect to plane 94.

A lamp such as a flash tube 128 is disposed in a reflector 130 behind a blue filter 132. A collimating system 134 directs light from flash tube 128 (occasionally referred to as the "blue flash tube" hereafter) toward DMD 46, the light impinging in a second direction marked by arrow 136. Second direction 136 is disposed at an angle of 70° with respect to plane 94 and at an angle of 40° with respect to first direction 116. When micromirror 56 is in its second position, as indicated by dotted line 92, the incoming light impinging from the second direction is reflected at an angle of 90° with respect to plane 94 and thus passes through projecting system 120 to screen 122. This is indicated by an arrow 138, which is coaxial with arrow 118. However when micromirror 56 is in its first position, indicated by line 90, light impinging from the second direction (i.e., the direction marked by arrow 136) is deflected in a direction shown by arrow 140 to an absorber 142. Absorber 142 is located at an angle of 50° with respect to plane 94.

To recapitulate, from FIG. 4 it will be apparent that red or green light impinging from a first direction marked by arrow 116 is reflected in the direction of arrow 118 when micromirror 56 is in its first position and that blue light impinging from a second direction marked by arrow 136 is reflected in the direction of arrow 138 when micromirror is in its second position. Arrows 136 and 118 are coaxial, and both represent light which is directed toward projection system 120.

Returning to FIG. 1, display apparatus 20 also includes a bias and reset unit 144 which operates under the control of control unit 38 to supply the bias voltage and resonant reset pulses as previously discussed. A buffer 146 detects when the last row electrode 54 has been strobed and provides a signal to an exposing or lighting unit 148. The red flash tube 96, green flash tube 102, and blue flash tube 128 are part of the lighting unit 148 and serve as an illuminating unit 150. Lighting unit 148 also includes a delay 152, a trigger unit 154, a selector 156, an address counter 158, a control ROM 160, a flash timer 162, and a lamp driver unit 164. Lamp driver unit 164 includes a high voltage source 168 which charges a capacitor 170 through a resistor 172 in order to supply energy to illumination unit 150 when one of the red, green, or blue flash tubes 96, 102, or 128 is fired, and a quenching circuit 174 which terminates the flash after a duration established by the flash timer 162.

Figure 5:
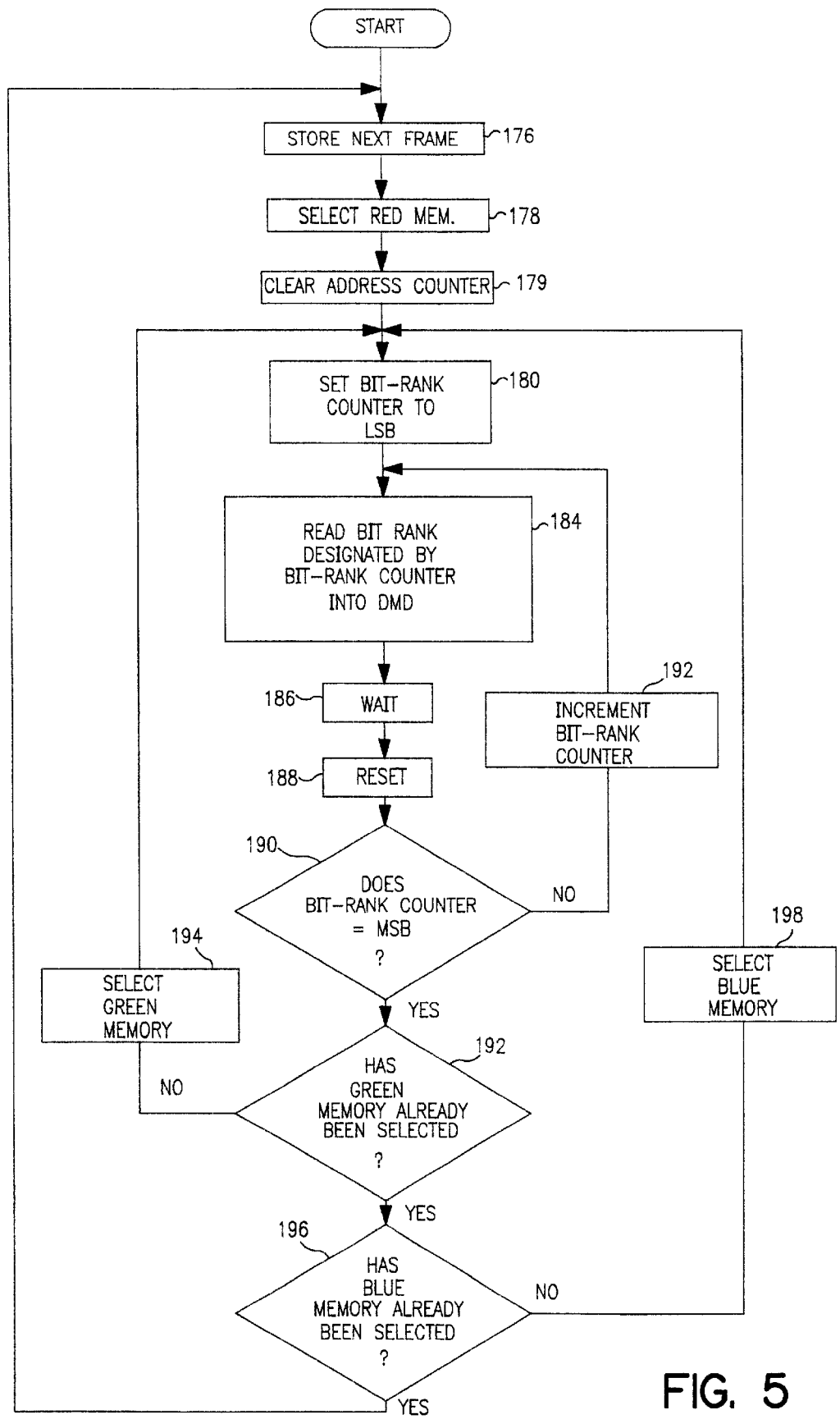
FIG. 5 is a flow chart illustrating part of the operation of the first embodiment.

The operation of display apparatus 20 is shown in the flow chart of FIG. 5. After one frame has been displayed, a new frame is stored in step 176 by transferring the red component of the new frame from memory 32 to memory 40, by transferring the green component of the new frame from memory 34 to memory 42, and by transferring the blue component of the new frame from memory 36 to memory 44. Memory 40, for example, stores video words corresponding in number and arrangement to the number and arrangement of micromirrors 56 in the DMD 46. Each of these video words has a least significant bit, a most significant bit, and at least one intermediate bit having a rank between that of the least significant bit and the most significant bit. Memories 42 and 44 are similar, except that they store video words for the green and blue components of the image.

Memory 40 is selected in step 178, and address counter 158 is cleared to 0 in step 179. A bit-rank counter in control unit 38 is set to 1, indicating the least significant bit, in step 180.

The bit rank designated by the bit rank counter is read into DMD 46 during step 184. When the bit rank counter is set to the least significant bit, this means that the least significant bit for all the video words which are stored in memory 40 (and which correspond to respective micromirrors 56) are transferred to memory cell and micromirror array 58. This is accomplished by transferring the least significant bits for a first raster line to serial/parallel converter and register 48 and strobing a first row electrode 54, transferring the least significant bits for a second raster line to converter and register 48 and strobing a second row electrode 54, and so forth until the least significant bits for the last raster line for the red component are transferred to converter and register 48 and the last row electrode 54 is strobed. Thereafter the program waits at step 186 for a period which permits lighting unit 148 to fire red flash tube 96 at a low level. This will be discussed in more detail later. Resonant reset pulses are supplied from unit 144 during step 188 in order to dislodge any micromirrors 56 that may have become stuck. Then a check is made at step 190 to determine whether the content of the bit rank counter in control unit 38 is equal to the most significant bit. If not, the bit rank counter is incremented at step 192 and the program returns to step 184. In the second repetition, the bits of the red component having a rank just above the least significant bits are transferred to array 58 in step 184, and the program waits at step 186 while lighting unit 148 administers a red flash having twice the light that was emitted during the flash for the least significant bits. Steps 184–190 are performed until the most significant bits of the red component have been displayed on array 58 and exposed to a red flash at a level commensurate with the most significant bit.

After the most significant bits of the red component have been displayed ("YES" at step 190), a check is made at step 192 to determine if memory 42, which stores the green component, has already been selected. If not, it is selected at step 194 and the program returns to step 180. The bits of the green component are displayed rank-by-rank, from the least significant bit to the most significant bit, while DMD 46 receives flashes of green light of increasing binary levels from lighting unit 148. If memory 42 has already been selected ("YES" at step 192), a check is made at step 196 to see whether memory 44 has been selected. If not, memory 44 is selected at step 198 and the blue component of the frame is displayed on DMD 46 rank-by-rank while lighting unit 148 supplies flashes of blue light at levels commensurate with the bit ranks which are being displayed. After the blue component has been displayed ("YES" at step 196), the program returns to step 176 and the red, green, and blue components of the next frame are displayed in the same way.

What happens during the wait at step 186 will now be described in more detail.

When the last row electrode 54 is strobed during storage of the least significant bits of the last raster line of the red component, buffer 146 supplies a pulse to lighting unit 148. This pulse is counted by address counter 158, which was cleared at step 179 in FIG. 5 and thus provides an output of 00 . . . 1 as an address signal to control ROM 160. ROM 160 stores lighting control words which determine which of the red, green, and blue flash tubes is selected and the level at which the selected flash tube is flashed. Each lighting control word includes a 3-bit color selection portion which is supplied via a bus 200 to selector 156 and a multi-bit light level portion which is supplied via a bus 202 to flash timer 162. The light level portion determines how long a flash is to last. The flash from a least significant bit is brief. For the next-least significant bit, the duration established by the light level portion provides a flash with twice the total amount of light that was emitted during the flash for the least significant bit. For the next least significant bit, the duration provides a flash with four times the total amount of light as the flash for the least significant bit. The durations of the flashes for higher-order bits are set in a similar way, with the amount of light liberated during a flash being commensurate with the rank of a bit. The color selection portion of the lighting control word is 001 if red flash tube 96 is to be selected, 010 if green flash tube 102 is to be selected, and 100 if blue flash tube 128 is to be selected.

The pulse from buffer 146 is delayed by the delay in unit 152 and then supplied to trigger unit 154, which generates a trigger pulse that is delivered to selector 156. Since the color selection portion of the lighting control word stored at location 00 . . . 1 in ROM 160 is 001, selector 156 forwards the trigger pulse to the trigger terminal 204 of red flash tube 96. This initiates a flash, using the energy stored on capacitor 170. The trigger pulse is also supplied via line 206 to flash timer 162, which begins timing the flash. Although not shown, flash timer 162 may include an oscillator, a counter which begins counting pulses from the oscillator when it receives the trigger signal on line 206, a register which holds the light level portion of the lighting control word received from ROM 160, and a comparator which signals quenching circuit 174 when the content of the counter reaches the value stored in the register.

After the flash for the least significant bit of the red component, further flashes for the red component are orchestrated under the control of subsequent lighting control words read out of ROM 160. The color selection portion of the lighting control words for all of the red flashes is 001 but the light level portions command different amounts of light that increase in a binary manner as indicated above. After the flashes of the red component, the flashes for the green and blue components are generated in a similar manner.

With reference next to FIGS. 1 and 4, it will be recalled that the red and green flashes impinge on DMD 46 from a first direction 116. When a particular bit of the red or green component is logical 1, the micromirror 56 which is influenced by that bit is moved to the position shown by line 90 and reflects the impinging light in the direction of arrow 118 to projecting system 120. However the blue flashes impinge on DMD 46 from a second direction marked by arrow 136, and when the micromirror 56 is in the position marked by solid line 90 these flashes are diverted to absorber 142. This is the reason why an inverter 208 is shown in FIG. 1 to invert the blue component stored in memory 44 before the blue component is transferred to converter and register 48. When a particular bit of the actual blue component is logical 1, meaning that a spot of blue light should be displayed on screen 122, inverter 208 inverts the bit to logical 0 in order for the corresponding flash of blue light to be reflected in the proper direction for display. That is, the position of a micromirror 56 indicated by solid line 90 is a display position for red and green dots but not for blue dots, and the position shown by dotted line 92 is a display position for blue dots but not for red or green dots.

It will be apparent to those skilled in the art that some of the functions performed by lighting unit 148 can be transferred to control unit 38. For example, lighting control words can be dealt out by a microprocessor in control unit 38, making counter 158 and ROM 160 unnecessary. It will also be apparent that unit 144 may apply and relieve the bias voltage in a manner which electromechanically latches the micromirrors 56 until they can all be updated at once at the conclusion of step 184. However, simultaneous updating of the micromirrors 56 is not necessary since it is only their positions at the time of a flash that counts. That is, it is sufficient if all of the micromirrors are in their updated positions at the end of step 184.

The Second Embodiment

Figure 6:
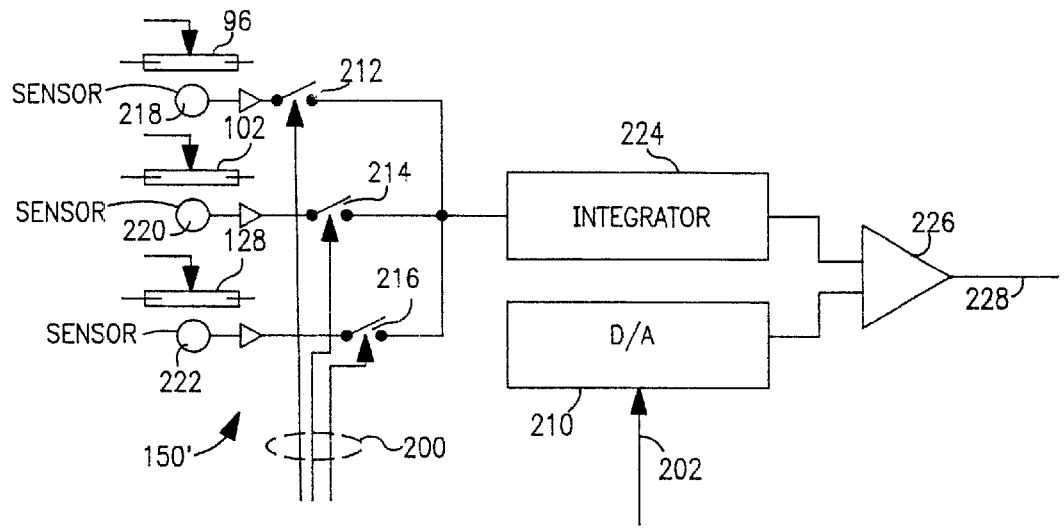
FIG. 6 is a block diagram illustrating an illumination unit in a second embodiment of the invention.

FIG. 6 illustrates a portion of the lighting unit in accordance with a second embodiment of the display apparatus of the present invention. This embodiment has a modified illumination unit 150' and not does require flash timer 162. Instead, the light level portions of the lighting control words are supplied from ROM 160 (see FIG. 1) to a D/A converter 210.

Illumination unit 150' includes lamps such as a red flash tube 96, a green flash tube 102, and a blue flash tube 128 which receive trigger signals from selector 156 (see FIG. 1). The color selection portions of the lighting control words are supplied to selector 156 as in the first embodiment, and are also supplied via a bus 200 to switches 212, 214, and 216. A light sensor 218 and an amplifier (not numbered) are connected to the input side of switch 212; a light sensor 220 and an amplifier (not numbered) are connected to the input side of switch 214; and a light sensor 222 and an amplifier (not numbered) are connected to the input side of switch 216. The color selection portion of the lighting control word causes one of the switches 212, 214, and 216 to close before the corresponding flash tube is flashed, thereby selecting which sensor signals are supplied to an integrator 224 during a flash. A comparator 226 emits a signal on line 228 to quench circuit 174 (see FIG. 1) when the total amount of light sensed during a flash is equal to that designated by the light level portion of the lighting control word.

In the first embodiment, the flash duration was controlled in order to set the total amount of light emitted during each flash. However, in the first embodiment the relation between flash duration and the total amount of light must be determined experimentally for a flash tube of a particular type before appropriate light level portions can be stored in ROM 160. The illumination unit 150' of the present embodiment alleviates this problem by measuring the flashes as they occur and comparing the integrated flashes with the desired light level.

The Third Embodiment

Figure 7:
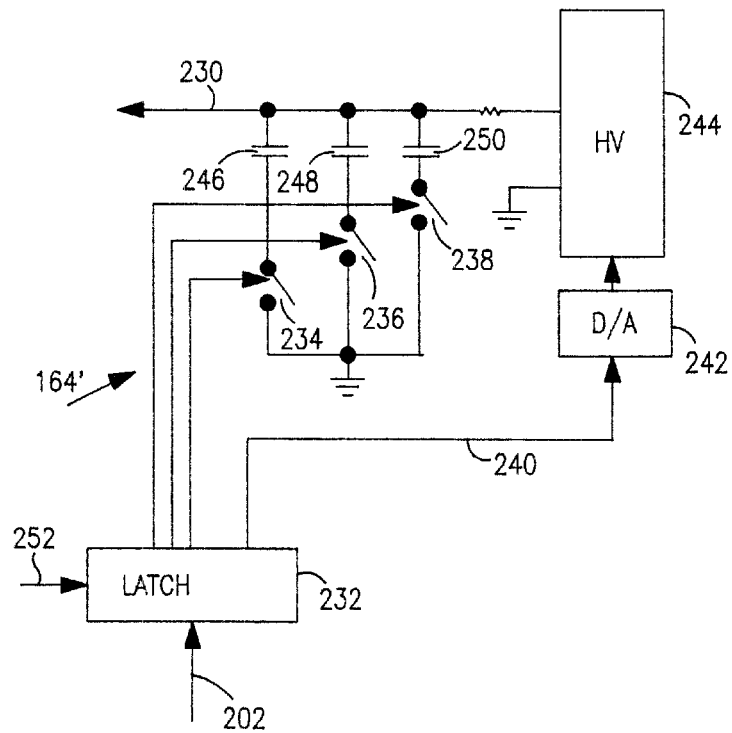
FIG. 7 is a block diagram illustrating a lamp driver unit in a third embodiment.
Figure 8:
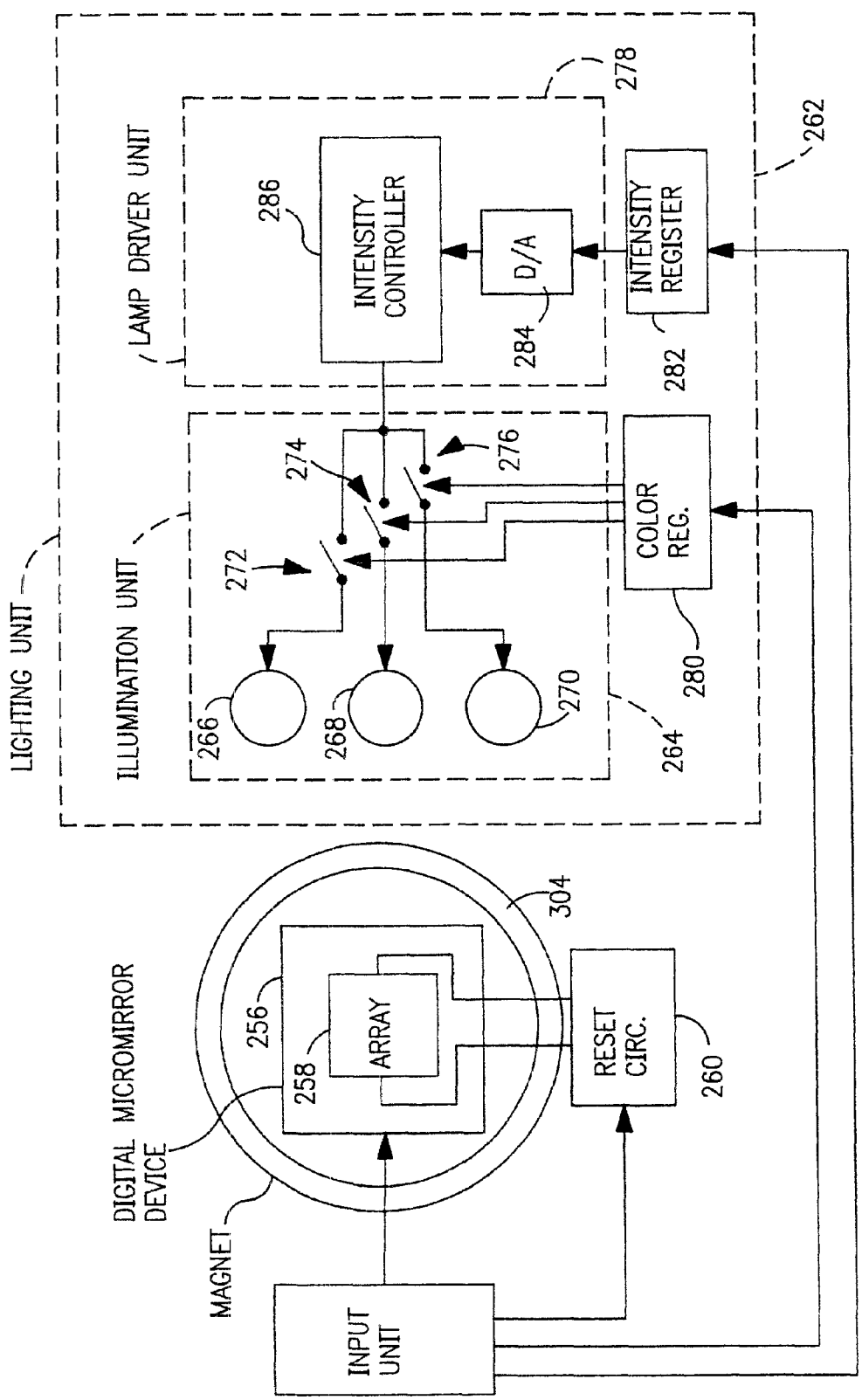
FIG. 8 is a block diagram of a display apparatus in accordance with a fourth embodiment of the present invention.

FIG. 7 illustrates a portion of an exposing or lighting unit in accordance with a third embodiment of the present invention. This lighting unit includes a modified lamp driver unit 164' which supplies power to the illumination unit 150 (see FIG. 1) via a line 230. Flash timer 162 is unnecessary in this embodiment.

Lamp driver unit 164' includes a latch 232 which receives the light level portion of the lighting control words from ROM 160 (see FIG. 1) via bus 202. The light level portion itself in this embodiment has a three-bit capacitance-selection portion which determines which of switches 234, 236, and 238 will be closed and a multi-bit charging-voltage portion which is supplied via a bus 240 to a D/A converter 242. D/A converter 242 supplies an analog signal to a control input port of a high voltage source 244, which charges capacitors 246, 248, and/or 250, depending upon which of switches 234–238 is closed, to the voltage set by the charging-voltage portion of the lighting control word.

Suppose that the capacitance of capacitor 250 is C units, that the capacitance of capacitor 248 is also C units, and that the capacitance of capacitor 246 is 2C units. This means that the total capacitance is C when switch 238 is closed, 2C when both the switches 236 and 238 are closed, and 4C when all three switches are closed.

The energy stored on a capacitor is given by the following equation:

$$E = \tfrac{1}{2}CV^2$$

Accordingly, for a given charging voltage V, one unit of energy can be stored by closing switch 238, two units of energy can be stored by also closing switch 236, and four units of energy can be stored by also closing switch 234. To store eight units of energy, only capacitor 250 would be charged, but it would be charged to a voltage that is larger than the original voltage V by a factor of $2\sqrt{2}$. Sixteen units of energy can be stored by charging both capacitors 248 and 250 to the higher voltage, $2\sqrt{2}V$. Thirty-two units of energy can be stored by charging all three capacitors to the higher voltage. This is summarized in the following Table:

TABLE

| Energy | Capacitance | Voltage |
| --- | --- | --- |
| 1 | C | V |
| 2 | 2C | V |
| 4 | 4C | V |
| 8 | C | $2\sqrt{2}V$ |
| 16 | 2C | $2\sqrt{2}V$ |
| 32 | 4C | $2\sqrt{2}V$ |

It will be apparent from the foregoing that the energy emitted during a flash can be controlled by designating the total capacitance using the capacitance-selection portion of the lighting control word and the voltage using the charging-voltage portion of the lighting control word. Even the simple example illustrated in the Table above shows that six binary levels are readily available, and more can easily be added by increasing the number of capacitors or the number of voltage levels to which they are charged.

From the discussion of the first embodiment it will be recalled that address counter 158 (see FIG. 1) supplies a new address to control ROM 160 each time the last row electrode 54 is strobed. In the third embodiment, however, it is desirable to let the selected capacitor or capacitors charge while new values are being read into array 58, and not to change the selection of capacitors or the charging voltage until after the flash has been delivered. For this reason, in the third embodiment control unit 38 emits a latch signal on line 252 when it begins reading a new bit rank into DMD 46 (step 184 in FIG. 5), at which point the lighting control word supplied by ROM 160 is latched. A new lighting control word is read out of ROM 160 when the last row electrode 54 is strobed, and the color selection portion of this new lighting control word determines which of the flash tubes 96, 102, and 128 is flashed, but the light level portion designated by the old lighting control word remains effective until after the flash is generated.

The Fourth Embodiment

A fourth embodiment of the display apparatus in accordance with the present invention will now be described with reference to FIGS. 8, 9, and 10A–10C. In this embodiment, an input unit 254 supplies digitalized red, green, and blue video words to a digital micromirror device or DMD 256. DMD 256 includes a memory cell and micromirror array 258. The display apparatus of this embodiment also includes a reset circuit 260 and an exposing or lighting unit 262.

The lighting unit 262 includes an illumination unit 264 having a red fluorescent lamp 266, a green fluorescent lamp 268, and a blue fluorescent lamp 270. Switches 272, 274, and 276 in illumination unit 264 selectively connect the lamps to a lamp driver unit 278. A color register 280 receives a three-bit color selection signal from input unit 254 to control which of the switches is closed. Switch 272 is closed to connect red lamp 266 to lamp driver unit 278 when the color selection signal is 100; switch 274 is closed to connect green lamp 268 to lamp driver unit 278 when the color selection signal is 010; and switch 276 is closed to connect blue fluorescent lamp 270 to lamp driver unit 278 when the color selection signal received from input unit 254 is 001.

Lighting unit 262 also includes an intensity register 282, which receives a multi-bit light intensity signal from input unit 254. The light intensity signal signifies how intensely the selected lamp is to be driven. The light intensity signal stored in register 282 is converted to analog by a D/A converter 284 and then supplied to a control input port of an intensity controller 286. Controller 286 steadily drives the selected lamp at the desired intensity by varying its duty cycle. In this application, "steady" emission of light by a selected lamp during an interval means light that is emitted throughout the interval, even if the light is periodically interrupted during the interval due to duty cycle control of the intensity of the illumination.

In the embodiments previously described, a negative bias voltage was supplied to the landing electrodes and the micromirrors to electromechanically latch the micromirrors into place while the memory cells were being updated, the bias voltage being briefly released thereafter to permit the micromirrors to move to their new states simultaneously. In contrast, in the present embodiment, the landing electrodes and the micromirrors are kept at ground potential (or at a negative potential whose absolute value is insufficient to cause electromechanical latching). Each row of micromirrors is therefore free to respond while the memory cells beneath them are updated. If light is shining on the micromirrors at a time when all of them are positioned to be OFF and if the micromirrors are then moved to their ON positions on a row-by-row basis from the first row to the last row, it is apparent that the first row of micromirrors receives more light than the last row. But if the micromirrors are then turned OFF from the first row to the last row, at the same rate they were previously turned ON, they will remain in the ON state for the same amount of time and consequently receive the same amount of light if they are steadily illuminated. When the turn-on and turn-off periods are considered together, each row receives half of the total amount of light emitted during the two periods.

The operation of this embodiment will now be described. It will be assumed that the red, green, and blue video words which DMD 256 receives from input unit 254 each have six bits. The discussion will start with the display of the least significant bit of the red component of the frame.

Figures 10A, 10B, 10C:
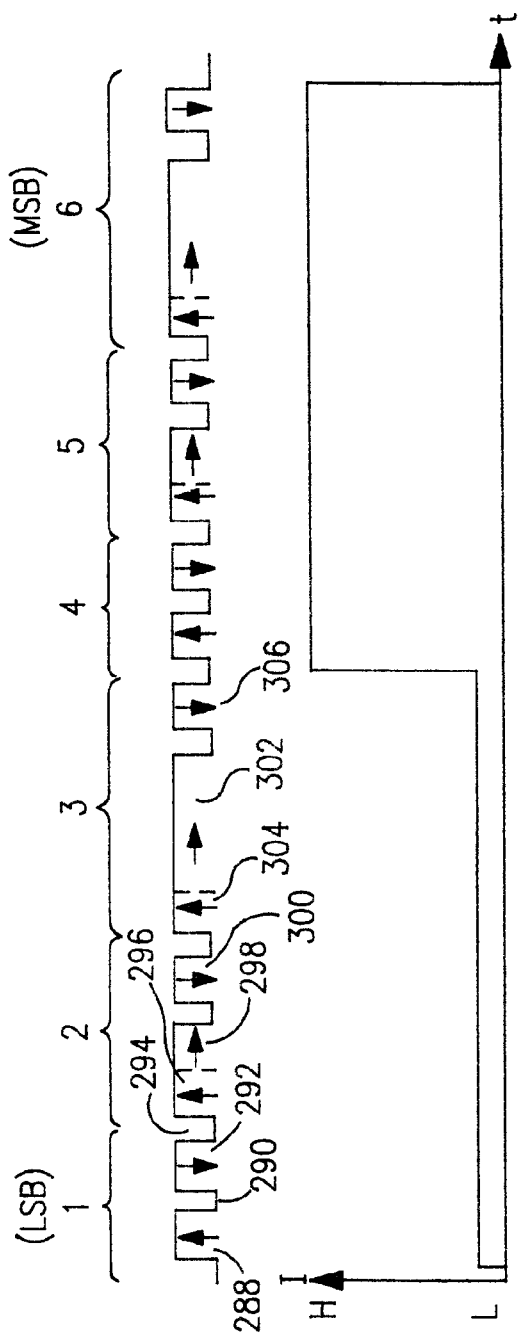
FIGS. 10A, 10B, and 10C pertain to the fourth embodiment and respectively illustrate the rank of bits that are displayed, how the writing, erasing, and maintaining of information displayed on the digital micromirror device depends upon the bit rank, and how the intensity of the lighting depends upon the bit rank.

Input 254 supplies color register 280 with a color control signal having a value of 100, thus causing switch 272 to close and connecting red lamp 266 to lamp driver unit 278. Input unit 254 also supplies register 282 with a light intensity signal which causes controller 286 to vary the duty cycle of lamp 266 so as to drive it at a low level L (see FIG. 10C). Then input unit 254 supplies the least significant bits of the red component row-by-row to DMD 256 during a turn-on period marked by reference number 288 in FIG. 10B. Turn-on periods in FIG. 10B, it is noted, are designated by upward arrows. Thereafter there is a brief resetting period 290 (the duration of which is much exaggerated in FIG. 10B) followed by a turn-off period 292 during which the micromirrors are turned off row-by-row at the same rate they were turned on previously (turn-off periods are identified by downward pointing arrows in FIG. 10B, and have the same duration as the turn-on periods). This completes the display of the least significant bit, as indicated in FIG. 10A. There follows a resetting period 294. As is the case with the other resetting periods shown in FIG. 10B, the duration of period 294 is exaggerated considerably in the drawing.

The display of the second bit begins with a turn-on period 296 followed by a maintain period 298 of the same duration. It is noted that maintain periods are designated in FIG. 10B by horizontal arrows. After a resetting period (not numbered), the display of the second bit is concluded by a turn-off period 300. Each row of micromirrors receives the same amount of light during the maintain period 298 as it does during the turn-on and turn-off periods 296 and 300 together. Thus the total amount of light received during display of the second bit by each row of micromirrors is twice that received during display of the least significant bit. This can be designated as 2L, in contrast to an amount 1L of light received during display of the least significant bit.

The maintain period 302 during display of the third bit is three times as long as the turn-on period 304 or the turn-off period 306. Consequently, the amount of light received by each row of micromirrors during display of the third bit is 4L.

At this point, input unit 254 supplies register 282 with an intensity signal which causes the intensity of the red light to increase eight-fold, to a new level H. The display of the fourth bit is accomplished with a turn-on period and a turn-off period but no maintain period. In this respect, the display of the fourth bit is the same as the display of the least significant bit, except the illumination is now at a high level H=8L. Thus twice as much light is received by each row of micromirrors during display of the fourth bit as was received during display of the third bit.

Display of the fifth bit and the sixth or most significant bit is the same as the display of the second and third bits, except at the higher intensity level H. After the most significant bit of the red component has been displayed, the green and blue components are displayed in a similar manner.

Although a biasing potential is not used to latch the micromirrors in this embodiment, it is still necessary to be concerned about sticking of the micromirrors due, perhaps, to cold welding. A torroidal magnet 304 is disposed around DMD 256 to create a magnetic field in the region of the micromirrors. This field has a vertical component (with respect to FIG. 8) which passes through array 258. As is shown schematically in FIG. 9, each row of micromirrors is connected to the reset circuit 260. Input unit 254 supplies a signal to reset circuit 260 during the resetting periods (e.g., 290, 294, and so forth), whereupon reset circuit 260 emits a pulse of electrical current which flows through each row of micromirrors. The interaction of the current and the magnetic field established by magnet 304 generates a Lorentz force which jostles each micromirror and thereby dislodges any that have become stuck. If desired, a series of current pulses can be generated by reset circuit 260 during each reset period, the series of pulses having a frequency matching the resonance frequency of the micromirrors.

Figure 9:
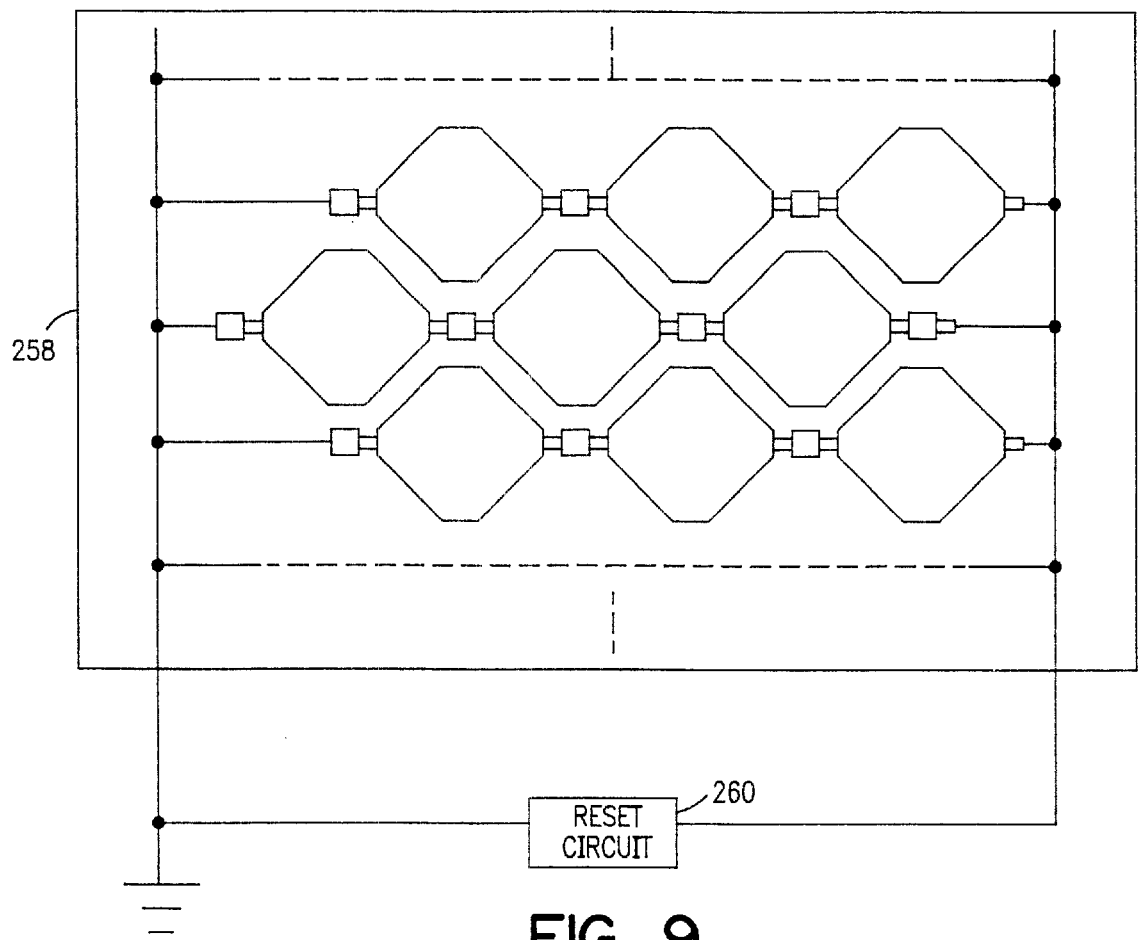
FIG. 9 is a top plan view schematically illustrating some of the micromirrors in the array shown in FIG. 8 and a reset circuit that emits pulses of current which interacts with a magnetic field in order to dislodge any micromirrors that become stuck.

As will be noted from FIG. 9, in this embodiment the micromirrors of alternate rows are offset with respect to the column direction. To compensate for this, it is desirable for the color signals for alternate raster lines to be shifted in phase by half of the pitch of the micromirrors before they are supplied to input unit 254. However if all of the input signals have the same phase, the values for adjacent pixels of alternate raster lines can be averaged in unit 254 before being supplied to DMD 256.

The Fifth Embodiment

Figure 11:
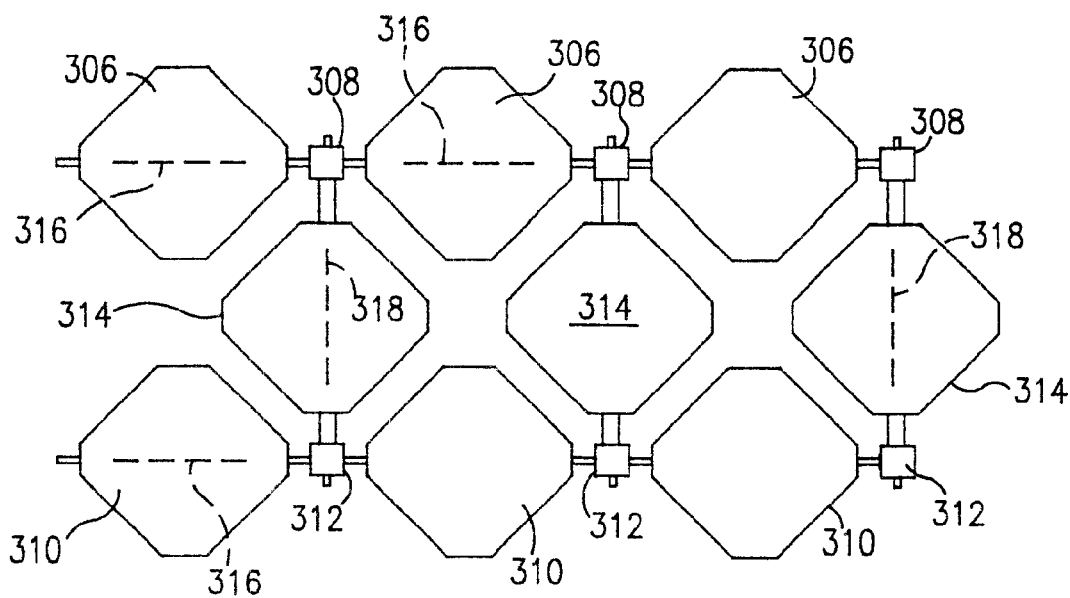
FIG. 11 illustrates a portion of the micromirror array in a fifth embodiment, which employs light impinging from three different directions.

In an embodiment shown in FIG. 11, micromirrors 306 in a first row are supported by posts 308 in the first row and micromirrors 310 in a second row are supported by posts 312 in the second row. However micromirrors 314 in an intermediate row do not have their own posts, but are instead supported by the posts 308 and 312 of the first and second rows. As a result of this arrangement, the micromirrors 306 and 310 pivot about axes 316 while the micromirrors 314 of the intermediate row pivot about orthogonal axes 318.

Fluorescent lamps are used in this embodiment and they steadily emit light when selected, as in the fourth embodiment. Their geometry is different from that shown in FIG. 4 in the following respects: The red and blue fluorescent lamps 266 and 270 are oriented the same way as the corresponding red and blue lamps 96 and 128 in FIG. 4. Red light therefore impinges on the DMD from a first direction 116 and blue light impinges on it from a second direction 136 (the video words for the blue component of the image are inverted, of course, as in the first embodiment). The first and second directions 116 and 136 lie in a common plane which is perpendicular to the pivot axes 318 shown in FIG. 11. Thus when the micromirrors 314 are pivoted to the right (with respect to FIG. 11) they can display red dots on screen 122, and when they are pivoted to the left they can display blue dots.

The green fluorescent lamp is located in a plane which is perpendicular to the pivot axes 316 and thus to the common plane of the first and second directions 116 and 136. That is, the position of green lamp 102 in this embodiment would not be the same as shown in FIG. 4, and half mirror 110 would be unnecessary. When micromirrors 306 and 310 are pivoted upward (with respect to FIG. 11) they display green dots and when they are pivoted downward they are OFF.

From this arrangement, every other row of micromirrors provides a raster line which displays both the red and blue components of the image and the remaining micromirrors provide raster lines which display the green component. Consequently two rows of micromirrors are needed to display all three color components, and thus the resolution attainable by this embodiment is not as large as that afforded by previous embodiments. However this embodiment has two significant advantages. One is that the light loss associated with half mirror 110 in FIG. 4 is avoided. The other is that the green component can be displayed by the micromirrors 314 while either the red or the blue component is displayed by the micromirrors 306 and 310. Because of this, the lamps for the red and blue components can be active for approximately half of the frame period rather than a third, and the lamp for the green component can be active for approximately the entire frame period. Consequently the power of the lamps can be reduced.

A modification of the resetting arrangement employed in the fourth embodiment can be used with this embodiment. A magnet 304 would be used, as would a reset circuit which emits current pulses to generate a Lorentz force. The current pulses would be applied horizontally through rows which include micromirrors 306 and 310 and then vertically through columns which include micromirrors 314.

The Sixth Embodiment

Figure 12:
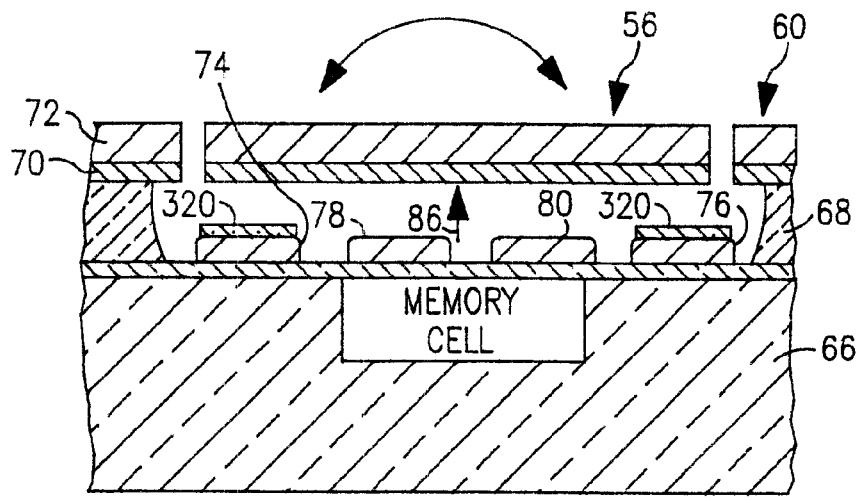
FIG. 12 is a cross-sectional view of a single micromirror and the underlying structure employed in a sixth embodiment, the sixth embodiment using piezoelectric layers to dislodge any micromirrors that have become stuck.

FIG. 12 illustrates yet another way to achieve resetting to dislodge micromirrors that have become stuck. The arrangement is the same as that shown in FIG. 3 except that layers 320 of piezoelectric ceramic are deposited on the landing electrodes 74 and 76. During resetting, the landing electrodes are maintained at ground potential and positive pulses are applied to the micromirrors 56. The voltage difference across the piezoelectric layers 320 causes them to move mechanically and thereby dislodge any stuck micromirrors.

For example, say that a positive potential has just been applied to actuation electrode 80 to rotate micromirror 56 in the clockwise direction (with respect to FIG. 12) and that it is now stuck against the layer 320 coating actuation electrode 76. The positive resetting pulses are applied while actuation electrode 80 is still positive, thereby generating a counter-clockwise torque which cooperates with the releasing effect produced by the physical movement of the piezoelectric layer 320.

It will be understood that the above descriptions of the present invention are susceptible to various other modifications, changes, and adaptations, and the same are intended to be comprehended within the meaning and range of equivalents of the appended claims.

What I claim is:

1. A display apparatus, comprising:
   a digital micromirror device having an array of movable micromirrors, and
   exposing means for exposing the array of micromirrors to light of a first primary color, to light of a second primary color, and to light a third primary color, the light of the first primary color and the light of the third primary color impinging on the array from a first direction and the light of the second primary color impinging on the array from a second direction, the exposing means comprising a partially-transmissive, partially reflective optical element which transmits the light of the first primary color before it impinges on the array and which reflects the light of the third primary color before it impinges on the array.

2. The display apparatus of claim 1, wherein the exposing means further comprises generating means for generating light in brief flashes having different levels.

3. The display apparatus of claim 2, wherein the generating means comprises timer means for setting the duration of a flash.

4. The display apparatus of claim 2, wherein the generating means comprises means for sensing the amount of light generated during a flash.

5. The display apparatus of claim 2, wherein the generating means comprises a first capacitor, and means for selectively charging the first capacitor to at least two voltage levels.

6. The display apparatus of claim 5, wherein the generating means further comprises a second capacitor, and means for selectively connecting the second capacitor in parallel with the first capacitor so as charge both capacitors to the same voltage level.

7. The display apparatus of claim 1, wherein the exposing means further comprises generating means for steadily generating light having a first level during a first period and a second level during a second period.

8. The display apparatus of claim 1, further comprising resetting means for dislodging any micromirrors that become stuck, the resetting means including means for exposing the array of micromirrors to a magnetic field.

9. The display apparatus of claim 1, further comprising resetting means for dislodging any micromirrors that become stuck, the resetting means including piezoelectric material beneath the micromirrors.

10. The display apparatus of claim 1, wherein the micromirrors are disposed so that a common plane passes through all of the micromirrors, wherein each micromirror is pivotable with respect to the common plane between a first position and a second position, wherein the first direction is such that, when a given one of the micromirrors is in its first position, light impinging on said given one of the micromirrors from the first direction is reflected in a direction perpendicular to the common plane, and wherein the second direction is such that, when said given one of the micromirrors is in its second position, light impinging on said given one of the micromirrors from the second direction of reflected in the direction perpendicular to the common plane.

11. A display apparatus, comprising:
    a digital micromirror device having an array of movable micromirrors; and
    resetting means for dislodging any micromirrors that become stuck, the resetting means including means for exposing the array of micromirrors to a magnetic field and means for causing current to flow through the micromirrors.

12. A display apparatus, comprising:
    a digital micromirror device having an array of movable micromirrors, and
    resetting means for dislodging any micromirrors that become stuck, the resetting means including piezoelectric material beneath the micromirrors.

13. A method of displaying a sequence of frames of video information on a digital micromirror device having an array of micromirrors that are disposed in rows and that are movable between a first position and a second position, the video information for a frame including a plurality of first multi-bit video words, each micromirror corresponding to one of the first multi-bit video words, each of the first multi-bit video words including at least a most significant bit and a least significant bit, comprising:

(a) moving micromirrors which correspond to first video words whose least significant bit has a predetermined value from their first positions to their second positions, the micromirrors of a first one of the rows being moved before the micromirrors of a last one of the rows;

(b) returning the micromirrors that were moved during step (a) to their first positions, the micromirrors of the first row being returned before the micromirrors of the last row; and (c) steadily exposing the micromirrors to light at a first level while step (a) is conducted and while step (b) is conducted.

14. The method of claim 13, further comprising the steps of:

(d) moving micromirrors which correspond to first video words whose most significant bit has the predetermined value from their first positions to their second positions, the micromirrors of the first row being moved before the micromirrors of the last row;

(e) returning the micromirrors that were moved during step (d) to their first positions, the micromirrors of the first row being returned before the micromirrors of the last row; and (f) steadily exposing the micromirrors to light at a second level while step (d) is conducted and while step (e) is conducted.

15. The method of claim 13, wherein the first video words correspond to a first primary color, wherein the video information for a frame additionally includes a plurality of second multi-bit video words which correspond to a second primary color, each second video word including at least a most significant bit and a least significant bit, wherein step (c) is conducted by shining light of the first primary color on the micromirrors so that the light impinges on them from a first direction, and wherein the method further comprises the steps of:

(d) moving micromirrors which correspond to second video words whose least significant bit has the predetermined value from their second positions to their first positions, the micromirrors of the first row being moved before the micromirrors of the last row;

(e) returning the micromirrors that were moved during step (d) to their second positions, the micromirrors of the first row being returned before the micromirrors of the last row; and (f) steadily exposing the micromirrors to light of the second primary color at the first level while step (d) is conducted and while step (e) is conducted, the light of the second primary color impinging on the micromirrors from a second direction.

16. The method of claim 13, further comprising the step of dislodging any micromirrors that become stuck by exposing the micromirrors to a magnetic field and running current through them.

17. The method of claim 13, further comprising the step of dislodging any micromirrors that become stuck by jolting them with piezoelectric material that is disposed beneath the micromirrors.

18. A display apparatus, comprising:

a digital micromirror having an array of pivotable micromirrors which have pivot axes, the pivot axes of some of the micromirrors being transverse to the pivot axes of others of the micromirrors; and exposing means for exposing the array of micromirrors to light of a first primary color which impinges on the array from a first direction, to light of a second primary color which impinges on the array from a second direction, and to light of a third primary color which impinges on the array from a third direction.

19. The display apparatus of claim 18, wherein the first and second directions define a plane, and wherein the third direction is transverse to the plane.

20. The display apparatus of claim 18, wherein the exposing means further comprises generating means for generating light in brief flashes having different levels.

21. The display apparatus of claim 20, wherein the generating means comprises timer means for setting the duration of a flash.

22. The display apparatus of claim 20, wherein the generating means comprises means for sensing the amount of light generated during a flash.

23. The display apparatus of claim 20, wherein the generating means comprises a first capacitor, and means for selectively charging the first capacitor to at least two voltage levels.

24. The display apparatus of claim 23, wherein the generating means further comprises a second capacitor, and means for selectively connecting the second capacitor in parallel with the first capacitor so as charge both capacitors to the same voltage level.

25. The display apparatus of claim 18, wherein the exposing means further comprises generating means for steadily generating light having a first level during a first period and a second level during a second period.

26. The display apparatus of claim 18, further comprising resetting means for dislodging any micromirrors that become stuck, the resetting means including means for exposing the array of micromirrors to a magnetic field.

27. The display apparatus of claim 18, further comprising resetting means for dislodging any micromirrors that become stuck, the resetting means including piezoelectric material beneath the micromirrors.

28. A display apparatus for displaying a sequence of frames of video information, the video information for a frame including a plurality of first video words for a first primary color component of the frame and a plurality of second video words for a second primary color component of the frame, each of the first video words having a predetermined number of bits and each of the second video words having a predetermined number of bits, said display apparatus comprising:

a digital micromirror device having an array of micromirrors that are movable between two positions, each of the first video words corresponding to one of the micromirrors and each of the second video words corresponding to one of the micromirrors;

moving means, responsive to the first and second video words, for selectively moving the micromirrors during a predetermined number of first time periods to display the bits of the first video words and for selectively moving the micromirrors during a predetermined number of second time periods to display bits of the second video words, the number of first time periods being the same as the number of bits in the first video words and the number of second time periods being the same as the number of bits in the second video words, the first time periods having durations that are substantially equal to one another and the second time periods having durations that are substantially equal to one another; and exposing means for exposing the array of micromirrors to light of the first primary color which impinges on the array from a first direction and to light of the second primary color which impinges on the array from a second primary color which impinges on the array from a second direction, the exposing means comprising generating means for generating first brief flashes of light of the first primary color during the first time periods and second brief flashes of light of the second primary color during the second time periods, the first brief flashes having different levels during different ones of the first time periods and the second brief flashes having different levels during different ones of the second time periods.

29. The display apparatus of claim 28, wherein the first brief flashes have durations that are shorter than the first time periods and the second brief flashes have durations that are shorter than the second time periods.

30. The display apparatus of claim 28, wherein the video information for a frame also includes a plurality of third video words for a third primary color component of the frame, each of the third video words corresponding to one of the micromirrors and having a predetermined number of the bits, wherein the moving means is also responsive to the third video words and comprises means for selectively moving the micromirrors during a predetermined number of third time periods to display the bits of the third video words, the number of third time periods being the same as the number of bits in the third video words, the third time periods having durations that are substantially equal to one another, and wherein the exposing means further comprises means for exposing the array of micromirrors to light of the third primary color.

31. The display apparatus of claim 30, wherein the number of bits in the first video words is the same as the number of bits in the second video words and is also the same as the number of bits in the third video words.

32. The display apparatus of claims 30, wherein the light of the third primary color impinges on the array from the first direction, and wherein the durations of the first time periods, the second time periods, and the third time periods are substantially equal.

33. The display apparatus of claim 30, wherein the first and second directions define a plane, wherein the light of the third primary color impinges on the array of micromirrors from a third direction which is transverse to the plane, wherein the directions of the first time periods are substantially equal the durations of the second time periods, and wherein the durations of the third time periods are longer than the durations of the first time periods.

34. The display apparatus of claim 28, wherein the generating means comprises timer means for setting the duration of a flash.

35. The display apparatus of claim 28, therein the generating means comprises means for sensing the amount of light generated during a flash.

36. The display apparatus of claim 28, wherein the generating means comprises a first capacitor, and means for selectively charging the first capacitor to at least two voltage levels.

37. The display apparatus of claim 36, wherein the generating means further comprises a second capacitor, and means for selectively connecting the second capacitor in parallel with the first capacitor so as charge both capacitors to the same voltage level.

38. A display apparatus for displaying a sequence of frames of video information, the video information for a frame including a plurality of first video words for a first primary color component of the frame and a plurality of second video words for a second primary color component of the frame, each of the first video words having a predetermined number of bits and each of the second video words having a predetermined number of bits, said display apparatus comprising:

a digital micromirror device having an array of micromirrors that are movable between two positions, each of the first video words corresponding to one of the micromirrors and each of the second video words corresponding to one of the micromirrors;

moving means, responsive to the first and second video words, for selectively moving the micromirrors during a predetermined number of first time periods to display the bits of the first video words and for selectively moving the micromirrors during a predetermined number of second time periods to display bits of the second video words, the number of first time periods being the same as the number of bits in the first video words and the number of second time periods being the same as the number of bits in the second video words, at least two of the first time periods having substantially the same duration and at least two of the second time periods having substantially the same duration; and exposing means for exposing the array of micromirrors to light of the first primary color which impinges on the array from a first direction and to light of the second primary color which impinges on the array from a second direction, the exposing means comprising means for steadily generating light having different levels during different ones of the at least two first time periods having substantially the same duration and for steadily generating light having different levels during different ones of the at least two second time periods having substantially the same duration.

39. The display apparatus of claim 38, wherein the video information for a frame also includes a plurality of third video words for a third primary color component of the frame, each of the third video words corresponding to one of the micromirrors and having a predetermined number of bits, wherein the moving means is also responsive to the third video words and comprises means for selectively moving the micromirrors during a predetermined number of third time periods to display the bits of the third video words, the number of third time periods being the same as the number of bits in the third video words, at least two of the third time periods having substantially the same duration, and wherein the exposing means further comprises means for exposing the array of micromirrors to light of the third primary color.

40. The display apparatus of claim 39, wherein the light of the third primary color impinges on the array of micromirrors from the first direction.

41. The display apparatus of claim 40, wherein the exposing means comprises a partially-transmissive, partially-reflective optical element which transmits the light of the first primary color before the light of the first primary color impinges on the array and which reflects the light of the third primary color before the light of the third primary color impinges on the array.

42. The display apparatus of claim 39, wherein the first and second directions define a plane, and wherein the light of the third primary color impinges on the array from a third direction which is transverse to the plane.

43. The display apparatus of claim 42, wherein the micromirrors of the array have pivot axes, the pivot axes of some of the micromirrors being transverse to the pivot axes of others of the micromirrors.

44. The display apparatus of claim 38, wherein the duration of the at least two of the first time periods which have substantially the same duration is a first duration, wherein the exposing means generates light with a first light level during one of the at least two first time periods having the first duration and light with a second light level during another of the at least two first time periods having the first duration, the second light level being higher than the first light level, wherein at least two others of the first time periods have a common second duration that is longer than the first duration, and wherein the exposing means generates light with the first light level during one of the at least two of the first time periods having the second duration and light with the second light level during another of the at least two of the first time periods having the second duration.

45. The display apparatus of claim 38, wherein the moving means comprises means for selectively moving micromirrors from an off position to an on position during a first portion of the each of the first time periods and then for returning the micromirrors that were moved during the first portion to their off position during second portion of each of the first time periods.

46. The display apparatus of claim 45, wherein some of the first time periods additionally have an intermediate portion, which is at least as long as the first portion, during which none of the micromirrors is moved by the moving means.

47. The display apparatus of claim 45, wherein the micromirrors are disposed in rows, and wherein the moving means comprises means for moving micromirrors in a first one of the rows before moving micromirrors in a last one of the rows during the first portion of the first time periods and for moving micromirrors in the first one of the rows before moving micromirrors in a last one of the rows during the second portion of the first time periods.

* * * * *